United States Patent
Wu et al.

(10) Patent No.: US 6,903,178 B2
(45) Date of Patent: Jun. 7, 2005

(54) ACID-FUNCTIONAL POLYURETHANE AND POLYUREA COMPOSITIONS FOR GOLF BALLS

(75) Inventors: Shenshen Wu, North Dartmouth, MA (US); Shawn Ricci, New Bedford, MA (US); Murali Rajagopalan, South Dartmouth, MA (US); Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/619,313

(22) Filed: Jul. 14, 2003

(65) Prior Publication Data

US 2004/0014535 A1 Jan. 22, 2004

Related U.S. Application Data

(63) Continuation of application No. 10/072,395, filed on Feb. 5, 2002, now Pat. No. 6,610,812.

(51) Int. Cl.[7] .............................................. C08G 18/10
(52) U.S. Cl. ............................. 528/60; 528/71; 528/85; 473/357; 473/365; 473/372; 473/373; 473/385
(58) Field of Search .............................. 528/60, 71, 85; 473/357, 365, 372, 373, 385

(56) References Cited

U.S. PATENT DOCUMENTS

| | | | |
|---|---|---|---|
| 3,147,324 A | 9/1964 | Ward | 264/254 |
| 4,123,061 A | 10/1978 | Dusbiber | 273/220 |
| 4,956,438 A | 9/1990 | Ruetman et al. | 528/60 |
| 5,071,578 A | 12/1991 | Ohkubo et al. | 252/62.54 |
| 5,085,941 A | 2/1992 | Ohkubo | 428/424.6 |
| 5,334,673 A | 8/1994 | Wu | 273/235 R |
| 5,484,870 A | 1/1996 | Wu | 528/28 |
| 5,661,207 A | 8/1997 | Carlson et al. | 524/414 |
| 5,691,066 A | 11/1997 | Rajagopalan | 428/421 |
| 5,733,428 A | 3/1998 | Calabria et al. | 264/134 |
| 5,908,358 A | 6/1999 | Wu | 473/378 |
| 5,968,605 A | 10/1999 | Lutz | 427/500 |
| 6,103,822 A | 8/2000 | Housel et al. | 524/840 |
| 6,207,784 B1 * | 3/2001 | Rajagopalan | 528/71 |

* cited by examiner

Primary Examiner—Rachel Gorr
(74) Attorney, Agent, or Firm—William B. Lacy

(57) ABSTRACT

A golf ball comprising a core having a compression greater than about 55; and an outer cover comprising an acid-functional polyurethane, polyurea, or copolymer thereof, the outer cover having a Shore D hardness of at least about 25, a thickness of from at least about 0.02 inches to about 0.03 inches, and a specific gravity of at least about 0.7.

19 Claims, No Drawings

ACID-FUNCTIONAL POLYURETHANE AND POLYUREA COMPOSITIONS FOR GOLF BALLS

CROSS-REFERENCE TO RELATED APPLICATIONS

This Application is a continuation of U.S. application Ser. No. 10/072,395, filed Feb. 5, 2002 now U.S. Pat. No. 6,610,812, the disclosure of which is incorporated herein, in its entirety, by reference.

FIELD OF THE INVENTION

The invention generally relates to golf balls and, more particularly, to golf balls having covers, intermediate layers or cores which comprise at least one acid-functional polyurethane, polyurea, or copolymer thereof.

BACKGROUND OF THE INVENTION

Golf ball covers are typically formed from a variety of materials, including balata and ionomer resins. Balata is a natural or synthetic trans-polyisoprene rubber. Balata covered balls are favored by the more highly skilled golfers because the softness of the cover allows the player to achieve spin rates sufficient to more precisely control ball direction and distance, particularly on shorter shots.

However, balata covered balls are easily damaged, and thus lack the durability required by the average golfer. Accordingly, alternative cover compositions have been developed in an attempt to provide balls with spin rates and a feel approaching those of balata covered balls, while also providing a golf ball with a higher durability and overall distance.

Ionomer resins have, to a large extent, replaced balata as a cover stock material. Chemically, ionomer resins are a copolymer of an olefin and an alpha, beta ethylenically unsaturated carboxylic acid having the carboxylic acid groups neutralized to various extent by a metal ion. Commercially available ionomer resins include, for example, copolymers of ethylene and methacrylic or acrylic acid neutralized with metal salts. These are sold by E. I. DuPont de Nemours and Co. under the trademark SURLYN® and by the Exxon Corporation under the trademark ESCOR® and the trademark IOTEK®. These ionomer resins are distinguished by type of metal ion, amount of acid, and degree of neutralization. While SURLYN® covered golf balls possess virtually cut-proof covers, they have inferior spin and feel properties as compared to balata covered balls.

Polyurethanes have also been recognized as useful materials for golf ball covers since as early as about 1960. For example, U.S. Pat. No. 3,147,324 is directed to a method of making a golf ball having a polyurethane cover. The curing agents disclosed are diamines, polyols or air moisture. The disclosed polyurethane covered golf balls are durable, while at the same time maintaining the "feel" of a balata ball.

Various companies have investigated the usefulness of polyurethane as a golf ball cover material. For example, U.S. Pat. No. 4,123,061 discloses a golf ball made from a polyurethane prepolymer of polyether and a curing agent, such as a trifunctional polyol, a tetrafunctional polyol or a diamine. U.S. Pat. No. 5,334,673 discloses the use of thermoset and thermoplastic polyurethanes for forming golf ball covers, and in particular, thermoset polyurethane covered golf balls made from a composition of polyurethane prepolymer and a slow-reacting amine curing agent and/or a difunctional glycol.

Unlike SURLYN® covered golf balls, polyurethane golf ball covers can be formulated to possess soft cover characteristics. However, golf ball covers made from polyurethane have not, to date, fully matched SURLYN® golf balls with respect to resilience or the rebound of the golf ball cover, which is a function of the initial velocity of a golf ball after impact with a golf club.

Polyureas have also been proposed as cover materials for golf balls. For instance, U.S. Pat. No. 5,484,870 discloses a polyurea composition comprising the reaction product of an organic diisocyanate and an organic amine, each having at least two functional groups. Like polyurethanes, polyureas are not completely comparable to SURLYN® golf balls with respect to resilience or the rebound or damping behavior of the golf ball cover.

To improve the playing characteristics of polyurethane covered golf balls, the use of cationic polyurethane ionomers has been proposed in U.S. Pat. No. 5,691,066. Although, the inclusion of cationic polyurethane ionomers in a golf ball cover can further increase the resilience of the ball, there seems to be a limitation in this approach due to the limited choice of suitable alkylating agents used in the processing of such cationic polyurethanes.

Therefore, there remains a continuing need for balls having soft covers that provide improved resilience, increased cut, scratch and abrasion resistance, and enhanced adherence without adversely affecting overall performance characteristics of the golf balls.

SUMMARY OF THE INVENTION

The present invention is directed to a golf ball having a core and a cover, with at least one core or cover formed of a composition comprising at least one acid-functional polyurethane, polyurea, or copolymer thereof ("acid-functional polyurethane/polyurea"). The acid-functional group can be based on a carboxylic, sulfonic or phosphoric acid group.

The invention is further directed to golf balls comprising a core with at least one outer core layer that comprises at least one acid-functional polyurethane/polyurea, as well as golf balls that comprise a cover having an inner cover layer and an outer cover layer formed of this material. The acid-functional polyurethane/polyurea may be formed by reacting at least one acid-functional polyurethane or polyurea prepolymer with a curing agent.

In a first embodiment of the invention, the polyurethane prepolymer is the reaction product of at least one acid-functional polyol or oligomer and an isocyanate, and has a formula:

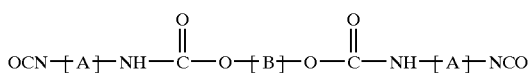

where
A=a straight chain or branched aliphatic or alicyclic group, a substituted straight chain or branched aliphatic or alicyclic group, or an aromatic or substituted aromatic group;
B=R—Y;
R=a straight chain or branched aliphatic or alicyclic group, a substituted straight chain or branched aliphatic or alicyclic group, or an aromatic or substituted aromatic group; and
Y=HSO$_3$, HCO$_2$, or H$_2$PO$_3$.

Suitable candidates for the acid-functional polyol or oligomer include carboxylated, sulfonated or phosphonated derivatives of polyester polyol; polyether polyol; polylactone polyol; polytetramethylene ether glycol; poly(oxypropylene)glycol; polybutadiene glycol; polyethylene adipate glycol; polyethylene propylene adipate glycol; polybutylene adipate glycol; diethylene glycol initiated caprolactone; 1,4-butanediol initiated caprolactone; trimethylol propane initiated caprolactone; neopentyl glycol initiated caprolactone; and oligomers of dimethylol proprionic acid or oligomers of isophthalic sulfonic acid; and mixtures thereof.

Preferably, the acid-functional polyol or oligomer has an acid number of at least about 10, more preferably from about 25 to about 150; a hydroxyl number of at least about 10, more preferably from about 20 to about 175; and a hydroxyl functionality of at least about 1.8. The prepolymer formed from the acid-functional polyol or oligomer and the isocyanate preferably has an isocyanate content of from about 2% to about 32%. When the prepolymer is mixed with the curing agent to make acid-functional polyurethane/polyurea, the quantities of the chemicals are adjusted so that the equivalent weight ratio of the isocyanate to the curing agent is preferably about 0.80 to about 1.20.

Suitable isocyanates include 4,4'-diphenylmethane diisocyanate; 3,3'-dimethyl-4,4'-biphenylene diisocyanate; toluene diisocyanate; polymeric diphenylmethane diisocyanate; modified liquid 4,4'-diphenylmethane diisocyanate; hexamethylene-diisocyanate; 4,4'-dicyclohexylmethane diisocyanate; isophorone diisocyanate; meta-tetramethylxylene diisocyanate; para-tetramethylxylene diisocyanate; para-phenylene diisocyanate; meta-phenylene diisocyanate; and low free isocyanate of said isocyanates.

The curing agent may be either an amine curing agent, a glycol curing agent, or a mixture thereof. Suitable amine curing agents include 4,4'-bis-(sec-butylamino)-dicyclohexylmethane; 1,4-bis-(sec-butylamino)-cyclohexane; 3,5-dimehtylthio-2,4 (2,6)-toluenediamine; 3,5-diethyl-2,4 (2,6)-toluenediamine; N,N'-dialkyldiamine diphenyl methane; trimethylene-glycol-di-p-aminobenzoate; and polytetramethyleneoxide-di-p-aminobenzoate with molecular weight ranging from about 250 to about 1000, while suitable glycol curing agents include ethylene glycol; diethylene glycol; propylene glycol; 1,3-propane glycol; 1,4-butanediol; 1,5-pentanediol; 1,6-hexanediol; and polytetramethylene ether glycol with molecular weight ranging from about 250 to about 1000.

In an alternative embodiment of the invention, the polyurethane prepolymer is made from a polyol or oligomer and at least one acid-functional isocyanate, and has a formula:

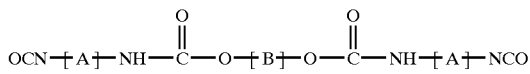

where
A=R—Y;
B=a straight chain or branched aliphatic or alicyclic group, a substituted straight chain or branched aliphatic or alicyclic group, or an aromatic or substituted aromatic group;
R=a straight chain or branched aliphatic or alicyclic group, a substituted straight chain or branched aliphatic or alicyclic group, or an aromatic or substituted aromatic group; and
Y=$HSO_3$, $HCO_2$, or $H_2PO_3$.

Suitable acid-functional isocyanates include carboxylated, sulfonated or phosphonated derivatives of diphenylmethane-2,4'-diisocyanate; diphenylmethane-4,4'-diisocyanate; 3,3'dimethyl-4,4'-biphenylene diisocyanate; 2,4-toluene diisocyanate; methylenebis-(4-cyclohexyl diisocyanate); phenylene-1,4-diisocyanate; diphenyl ether 4,4'-diisocyanate; naphthylene-1,5,-diisocyanate; p-phenylene diisocyanate; p,p'-diphenyl diisocyanate; hexahydrophenylene-1,3-diisocyanate; hexahydrophenylene-1,4-diisocyanate; triphenylmethane-4,4',4"-triisocyanate; perhydrodiphenylmethane-2,4'-diisocyanate; perhydrodiphenylmethane-4,4'-diisocyanate; ethylene diisocyanate; propylene-1,2-diisocyanate; tetramethylene-1,4-diisocyanate; hexamethylene-1,6-diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; 1,3-xylene diisocyanate; or a mixture thereof.

In another embodiment of the invention, the polyurea prepolymer is constituted of at least one acid-functional organic amine and an isocyanate, and has a formula:

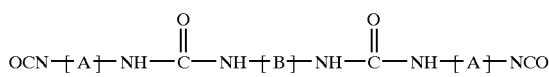

where
A=a straight chain or branched aliphatic or alicyclic group, a substituted straight chain or branched aliphatic or alicyclic group, or an aromatic or substituted aromatic group;
B=R—Y;
R=a straight chain or branched aliphatic or alicyclic group, a substituted straight chain or branched aliphatic or alicyclic group, or an aromatic or substituted aromatic group; and
Y=$HSO_3$, $HCO_2$, or $H_2PO_3$.

Preferred acid-functional organic amines include carboxylated, sulfonated or phosphonated derivatives of polyolamines; polymethylene-di-p-aminobenzoates; polyethyleneglycol-bis(4-aminobenzoates); polydimethylsiloxane-bis(4-aminobenzoates); polytetramethyleneetherglycol-di-p-aminobenzoates; polypropyleneglycol-di-p-aminobenzoates; N,N,N',N'-tetramethyl-ethylenediamine; 1,4-diazobicyclo(2,2,2)-octane; N-methyl-N'-dimethylaminoethylpiperazine; N,N-dimethylbenzylamine; bis-(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-.beta.-phenylethylamine; 1,2-dimethylimidazole; 2-methylimidazole; or a mixture thereof.

In a further embodiment of the invention, the polyurea prepolymer is made of an organic amine and at least one acid-functional isocyanate, and has a formula:

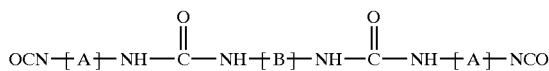

where
A=R—Y;
B=a straight chain or branched aliphatic or alicyclic group, a substituted straight chain or branched aliphatic or alicyclic group, or an aromatic or substituted aromatic group;
R=a straight chain or branched aliphatic or alicyclic group, a substituted straight chain or branched aliphatic or alicyclic group, or an aromatic or substituted aromatic group; and Y=$HSO_3$, $HCO_2$, or $H_2PO_3$.

The compositions of the polyurethane/polyurea prepolymer may also include an additional polyol to formulate an acid-functional copolymer. Polyols appropriate for the copolymer compositions include polytetramethylene ether glycol; poly(oxypropylene) glycol; poly(ethylene oxide capped oxypropylene) glycol; diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,5-pentanediol initiated polycaprolactone; 1,6-hexanediol initiated polycaprolactone; polytetramethylene ether glycol initiated polycaprolactone; polyethylene adipate glycol; polyethylene propylene adipate glycol; polybutylene adipate glycol; ortho-phthalate-1,6-hexanediol polyester polyol; polyethylene terephthalate polyester polyol; poly(hexamethylene adipate) glycol; poly(phthalate carbonate) glycol; poly(hexamethylene carbonate) glycol; polycarbonate glycols containing bisphenol A; hydroxy-terminated polybutadiene glycol; hydroxy-terminated liquid isoprene rubber; acrylic polyol; p-dimer alcohols covered from dimerized fatty acids, and mixtures thereof.

To enhance the characteristics of the acid-functional polyurethane/polyurea or to provide it with other desirable properties, the composition of the acid-functional polyurethane/polyurea may further be blended with one additional thermoplastic or thermoset polymer, such as non-anionic polyurethanes, epoxy resins, polyethylenes, polyamides, polyesters, acid copolymers or their ionomer derivatives, or mixtures thereof. Other useful additives for the acid-functional polyurethane/polyurea composition include catalysts; surfactants; blowing agents for foams; stabilizers; metals; colorants including pigments and dyes; density fillers; viscosity modifiers; release agents; plasticizers; processing aids; antioxidants; compatibility agents; dispersing agents; UV absorbers; hindered amine light stabilizers; and mixtures thereof.

In an alternative embodiment, the acid-functional polyurethane, polyurea, or copolymer thereof may be partially or fully neutralized with an organic or an inorganic base moiety.

Additionally, a golf ball with a core and a cover may have at least one of the core or the cover made of an acid-functional polyurethane/polyurea prepolymer that has an acid-functional polyol or oligomer, and the prepolymer has a formula:

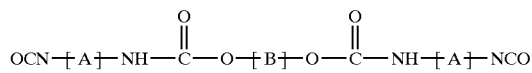

where

A=a straight chain or branched aliphatic or alicyclic group, a substituted straight chain or branched aliphatic or alicyclic group, or an aromatic or substituted aromatic group;

B=R—Y;

R=a straight chain or branched aliphatic or alicyclic group, a substituted straight chain or branched aliphatic or alicyclic group, or an aromatic or substituted aromatic group; and Y=$HSO_3$, $HCO_2$, or $H_2PO_3$.

Further in accordance with the present invention, a golf ball with a core and a cover may also have at least one of the core or the cover made of an acid-functional polyurethane/polyurea in an amount sufficient to increase the golf ball's coefficient of restitution ("COR") by at least about 5%, in comparison to a golf ball made of a polyurethane/polyurea without acid-functional groups.

The novel golf ball of the present invention offers improved performance in comparison to golf balls disclosed in the prior art which lack the acid-functional polyurethane/polymer component. Further these balls may also provide enhanced distance (i.e., resilience) without adversely affecting, and in many instances while improving, their "playability" characteristics, i.e., spin, compression, etc.

DESCRIPTION OF THE PREFERRED EMBODIMENTS

Broadly, the present invention contemplates a golf ball comprising an acid-functional polyurethane/polyurea. The ball may be a one-piece ball formed from a homogeneous mass consisting entirely of such materials, or including blends of conventional golf ball cover materials, such as those discussed herein below, with an acid-functional polyurethane/polyurea. Further, the materials described above may be in the form of a foamed polymeric material.

One-piece balls will generally have a dimple pattern molded therein. One-piece balls in accordance with the present invention are quite durable, but do not provide great distance because of relatively high spin and low velocity.

A more preferred aspect of the present invention comprises two-piece, multilayer and/or wound balls having cores, intermediate layers, covers and/or coatings comprising an acid-functional polyurethane/polyurea of the type disclosed herein.

A "cover" or a "core" as these terms are used herein includes a structure comprising either a single layer or one with two or more layers. As used herein, a core described as comprising a single layer means a unitary or "one-piece" core. The "layer" thus includes the entire core from the center of the core to its outer periphery. A core, whether formed from a single layer or from two or more layers may serve as a center for a wound ball. An intermediate layer may be incorporated, for example, with a single layer or multi-layer cover, with a single layer or multi-layer core, with both a single layer cover and core, or with both a multi-layer cover and a multi-layer core. A layer may additionally be composed of a tensioned elastomeric material, i.e., known as a wound layer. Intermediate layers of the type described above are sometimes referred to in the art, and, thus, herein as well, as an inner cover layer, as an outer core layer, or as a mantle layer.

The polyurethane and polyurea of the invention include acid-functional moieties or groups. Typically, such groups are incorporated onto the polyol or amine component of the polyurethane or polyurea, respectively. Alternatively, the acid-functional group can also be attached to the isocyanate or isocyanate component of the polyurethane or polyurea. The term "isocyanate" used herein include without limitation any and all mono-isocyanates, diisocyanates, and polyisocyanates. The acid-functional group is based on a sulfonic, carboxylic or phosphoric acid group. Also, more than one type of acid-functional group can be incorporated into the polyurethane or polyurea.

The acid-functional polyurethane/polyurea can be typically prepared according to two methods. Preferably, in a first method, the acid-functional polyurethane/polyurea can be made from a prepolymer having acid-functional moieties. Alternatively, in a second method, the acid-functional group(s) can be incorporated during a post-polymerization reaction, whereby the acid-functional group(s) are introduced or attached to the polyurethane/polyurea. One of ordinary skill in the art would be aware of other ways to prepare the acid-functional polyurethane/polyurea. For instance, a hybrid of the above-described methods can be used as described in U.S. Pat. No. 5,661,207, the disclosure of which is incorporated by reference in its entirety herein.

To prepare acid-functional polyurethane according to the first preferred method, an acid-functional prepolymer is first made by reacting an acid-functional group containing polyol with at least one isocyanate. Exemplary acid-functional polyurethane prepolymer with acid-functional groups attached to the polyol component of the prepolymer are characterized by the following chemical structure:

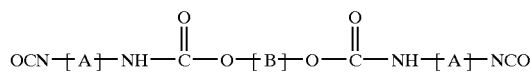

where
A=a straight chain or branched aliphatic or alicyclic group, a substituted straight chain or branched aliphatic or alicyclic group, or an aromatic or substituted aromatic group;
B=R—Y;
R=a straight chain or branched aliphatic or alicyclic group, a substituted straight chain or branched aliphatic or alicyclic group, or an aromatic or substituted aromatic group; and
Y=$HSO_3$, $HCO_2$, or $H_2PO_3$.

The acid-functional polyols useful for making acid-functional polyurethane prepolymers include conventional polyols having an acid-functional group. Examples of such suitable polyols are described in U.S. Pat. No. 5,085,941, the disclosure of which is incorporated by reference in its entirety herein. When processed below 80° C., the terminal hydroxyl groups on the polyols can react with isocyanate groups to make polyurethane prepolymers with pendant acid-functional groups attached to the polymeric backbone. The resulting polyurethane elastomers have pendant acid-functional groups distributed throughout the soft segment of the polyurethane and not primarily situated near the hard segment, and the acid-functional groups can improve adhesion, strength, and toughness of the polyurethanes.

Suitable acid-functional polyols should have an acid number (calculated by dividing acid equivalent weight to 56,100) of at least about 10, preferably from about 20 to about 420, more preferably from about 25 to about 150, and most preferably from about 30 to about 75. The polyols should also have an hydroxyl number (calculated by dividing hydroxyl equivalent number to 56,100) of at least about 10, preferably from about 20 to about 840, and more preferably from about 20 to about 175, and most preferably from about 50 to about 150. The polyols should further have a hydroxyl functionality (average number of hydroxyl groups per polyol molecule) of at least about 1.8, preferably from about 2 to about 4.

Preferred acid-functional polyols include carboxylated, sulfonated or phosphonated derivatives of polyester polyols. Other suitable acid-functional polyols are disclosed in detail in U.S. Pat. Nos. 5,661,207 and 6,103,822, along with reagents and methods used to derive such acid-functional polyols, the disclosures of which are incorporated herein by reference in their entirety. Additional polyols may be combined with these acid-functional polyols to formulate copolymer compositions, including without limitation poly-tetramethylene ether glycol; poly(oxypropylene) glycol; poly(ethylene oxide capped oxypropylene) glycol; diethyl-ene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,5-pentanediol initiated polycaprolactone; 1,6-hexanediol initiated polycaprolactone; polytetramethylene ether glycol initiated polycaprolactone; polyethylene adipate glycol; polyethylene propylene adipate glycol; polybutylene adipate glycol; ortho-phthalate-1,6-hexanediol polyester polyol; polyethylene terephthalate polyester polyol; poly(hexamethylene adipate) glycol; poly(phthalate carbonate) glycol; poly(hexamethylene carbonate) glycol; polycarbonate glycols containing bisphenol A; hydroxy-terminated polybutadiene glycol; hydroxy-terminated liquid isoprene rubber; acrylic polyol; p-dimer alcohols covered from dimerized fatty acids, and mixtures thereof.

Most preferred acid-functional polyols include the acid-functional polyester polyol; oligomers of dimethylol proprionic acid ("DMPA"); oligomers of isophthalic sulfonic acid; and Lexorez® 1405–65 manufactured by Inolex Chemical Company.

The isocyanate may be any isocyanate useful for forming a polyurethane/polyurea. Useful isocyanates include aliphatic, cycloaliphatic, araliphatic, aromatic polyisocyanates and combinations of these compounds which have two or more isocyanate (NCO) groups per molecule as well as their derivatives. The isocyanates may be organic, modified organic, organic polyisocyanate-terminated prepolymers, low free isocyanate of the above mentioned isocyanates, and mixtures thereof. Preferred isocyanates include substituted and unsubstituted isocyanates and isomeric mixtures, including 2,2'-, 2,4'- and 4,4'-diphenylmethane diisocyanate ("MDI"); 3,3'-dimethyl-4,4'-biphenylene diisocyanate ("TODI"); toluene diisocyanate ("TDI"); polymeric MDI; modified liquid 4,4'-diphenylmethane diisocyanate; hexamethylene-diisocyanate ("HDI"); 4,4'-dicyclohexylmethane diisocyanate ("$H_{12}$MDI"); isophorone diisocyanate ("IPDI"); para-phenylene diisocyanate ("PPDI"); meta-phenylene diisocyanate ("MPDI"); tetramethylene diisocyanate; dodecane diisocyanate; octamethylene diisocyanate; decamethylene diisocyanates; cyclobutane-1,3-diisocyanate; 1,2-; 1,3- and 1,4-cyclohexane diisocyanates; 2,4- and 2,6-methylcyclohexane diisocyanates; 4,4'- and 2,4'-dicyclohexyldiisocyanates; 1,3,5-cyclohexane triisocyanates; isocyanatomethylcyclohexane isocyanates; isocyanatoethylcyclohexane isocyanates; bis(isocyanatomethyl)-cyclohexane diisocyanates; 4,4'- and 2,4'-bis(isocyanatomethyl) dicyclohexane; isophorone diisocyanate; 2,4- and 2,6-hexahydrotoluenediisocyanate; 1,2; 1,3; and 1,4-phenylene diisocyanates; triphenyl methane-4,4'; 4"-triisocyanate; naphthylene-1,5-diisocyanate; 2,4'-; 4,4'- and 2,2-biphenyl diisocyanates; polyphenyl polymethylene polyisocyanates ("PMDI"); mixtures of MDI and PMDI; mixtures of PMDI and TDI; aromatic aliphatic isocyanates such as 1,2-; 1,3- and 1,4-xylylene diisocyanates; meta-tetramethylxylene diisocyanate ("m-TMXDI"); para-tetramethylxylene diisocyanate ("p-TMXDI"); and modified polyisocyanates derived from the above-isocyanates and polyisocyanates. Other suitable isocyanates are described in U.S. Pat. Nos. 5,661,207 and 6,103,822, the disclosures of which are incorporated herein by reference in their entirety.

Examples of acid-functional polyurethane prepolymer with acid-functional groups attached to the isocyanate moiety can have a chemical structure according to the following formula:

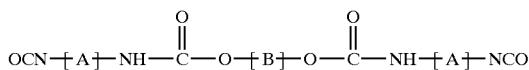

where
A=R—Y;
B=a straight chain or branched aliphatic or alicyclic group, a substituted straight chain or branched aliphatic or alicyclic group, or an aromatic or substituted aromatic group;
R=a straight chain or branched aliphatic or alicyclic group, a substituted straight chain or branched aliphatic or alicyclic group, or an aromatic or substituted aromatic group; and
Y=$HSO_3$, $HCO_2$, or $H_2PO_3$.

Suitable acid-functional isocyanates include without limitation conventional isocyanates having an acid-functional group. Such acid-functional isocyanates can be formed by reacting a isocyanate and an acid-functional group containing compound as described in U.S. Pat. Nos. 4,956,438 and 5,071,578, the disclosures of which are incorporated herein by reference in their entirety.

Preferred aromatic isocyanates include the carboxylated, sulfonated or phosphonated derivatives of diphenylmethane-2,4'-diisocyanate; MDI; TODI; TDI; phenylene-1,4-diisocyanate; diphenyl ether 4,4'-diisocyanate; naphthylene-1,5,-diisocyanate ("NDI"); PPDI; p,p'-diphenyl diisocyanate; hexahydrophenylene-1,3-diisocyanate; hexahydrophenylene-1,4-diisocyanate; triphenylmethane-4,4',4"-triisocyanate; perhydrodiphenylmethane-2,4'-diisocyanate; and perhydrodiphenylmethane-4,4'-diisocyanate.

Preferred aliphatic isocyanates include the carboxylated, sulfonated or phosphonated derivatives of ethylene diisocyanate; propylene-1,2-diisocyanate; tetramethylene-1,4-diisocyanate; hexamethylene-1,6-diisocyanate; dodecane-1,12-diisocyanate; methylenebis-(4-cyclohexyl diisocyanate) ("$H_{12}MDI$"); dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; and 1,3-xylene diisocyanate.

The acid-functional polyurethane prepolymer is then reacted with a curing agent to make an acidic polyurethane. Suitable curing agents typically include amines and/or glycols. Also, persons skilled in the art are aware of additional appropriate curing agents. Often a catalyst is employed to promote the reaction between the curing agent and the polyurethane prepolymer.

Preferred amine curing agents for use in the present invention include without limitation 4,4'-bis-(sec-butylamino)-dicyclohexylmethane (Clearlink® 1000); 1,4-bis-(sec-butylamino)-cyclohexane (Clearlink® 3000); 3,5-dimehtylthio-2,4 (2,6)-toluenediamine; 3,5-diethyl-2,4 (2,6)-toluenediamine; N,N'-dialkyldiamine diphenyl methane; trimethylene-glycol-di-p-aminobenzoate; and polytetramethyleneoxide-di-p-aminobenzoate with molecular weight ranging from about 250 to about 1000.

Preferred glycol curing agents for use in the present invention include without limitation ethylene glycol; diethylene glycol; propylene glycol; 1,3-propane glycol; 1,4-butanediol; 1,5-pentanediol; 1,6-hexanediol; polytetramethylene ether glycol with molecular weight ranging from about 250 to about 1000.

Similarly, an acid-functional polyurea prepolymer can be prepared from an acid-functional group containing organic amine and/or isocyanates. Suitable acid-functional polyurea prepolymers with acid-functional groups attached to the amine component of the prepolymers are characterized by the following chemical structure:

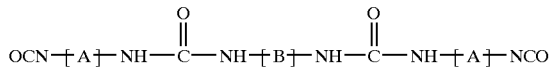

where
A=a straight chain or branched aliphatic or alicyclic group, a substituted straight chain or branched aliphatic or alicyclic group, or an aromatic or substituted aromatic group;
B=R—Y;
R=a straight chain or branched aliphatic or alicyclic group, a substituted straight chain or branched aliphatic or alicyclic group, or an aromatic or substituted aromatic group; and
Y=$HSO_3$, $HCO_2$, or $H_2PO_3$.

Preferred amines used for making the acid-functional polyurea prepolymers include the carboxylated, sulfonated or phosphonated derivatives of polymethylene-di-p-aminobenzoates; polyethyleneglycol-bis(4-aminobenzoates); polydimethylsiloxane-bis(4-aminobenzoates); polytetramethyleneetherglycol-di-p-aminobenzoates; polypropyleneglycol-di-p-aminobenzoates; N,N,N',N'-tetramethyl-ethylenediamine; 1,4-diazobicyclo(2,2,2)-octane; N-methyl-N'-dimethylaminoethylpiperazine; N,N-dimethylbenzylamine; bis-(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-β-phenylethylamine; 1,2-dimethylimidazole and 2-methylimidazole. The preferred isocyanates for preparing acid-functional polyurethane prepolymer from acid-functional polyols can also be used to make acid-functional polyurea prepolymers. Examples of suitable acid-functional polyurea prepolymers with acid-functional groups attached to the isocyanate component have a chemical structure according to the following formula:

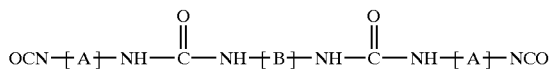

where
A=R—Y;
B=a straight chain or branched aliphatic or alicyclic group, a substituted straight chain or branched aliphatic or alicyclic group, or an aromatic or substituted aromatic group;
R=a straight chain or branched aliphatic or alicyclic group, a substituted straight chain or branched aliphatic or alicyclic group, or an aromatic or substituted aromatic group; and
Y=$HSO_3$, $HCO_2$, or $H_2PO_3$.

The suitable acid-functional isocyanates for preparing acid-functional polyurethane prepolymers can also be used to make acid-functional polyurea prepolymers. The polyurea prepolymer then react with a curing agent to yield an acid-functional polyurea. Suitable curing agents include those discussed earlier in connection with the formation of acid-functional polyurethanes. Also, persons skilled in the art are aware of additional appropriate curing agents.

As noted above, the acid-functional polyurethane/polyurea of the invention can also be prepared by post-polymerization reaction, in which the acid-functional groups are incorporated onto the polyurethane/polyurea substrate after it is formed first. Thermoset and thermoplastic polyurathanes and polyurea suitable for use by way of the post-polymerization reaction for the formation of acid-functional polyurathanes/polyurea are described in U.S. Pat. No. 6,207,784 which is incorporated by reference herein. Also polyurethanes which are cured with epoxy group containing curing agents can be used. Such polyurethanes are described U.S. Pat. No. 5,908,358 which is incorporated by reference herein. Moreover, the acid-functional polyurathanes/polyurea made by way of copolymerization as described above can be further incorporated with additional acid-functional groups through post-polymerization reaction. Suitable agents to incorporate acid-functional groups onto the polyurethane or polyurea substrate and method of making the same are also described in U.S. Pat. No. 6,207,784 which is incorporated by reference herein.

Alternatively, the acid-functional polyurethanes/polyurea formed with the above two methods can be further neutralized partially or fully with an organic or an inorganic base moiety to make anionic polyurethanes/polyurea ionomers. The base may be added either during preparation of the prepolymer, as a separate neutralization step on the already polymerized acid-functional polyurethanes/polyurea, or during dispersion of the polyurethanes/polyurea. The base may be added at any of these stages, or, if the stages occur simultaneously, the base is present throughout all stages.

The base can be a metal base and/or a tertiary amine. Metal bases include compounds such as metal oxides, metal hydroxides, metal carbonates, metal bicarbonates and metal acetates. The metal ion of the bases can be those of Group IA, IB, IIA, IIB, IIIA, IIIB, IVA, IVB, VA, VB, VIA, VIB, VIIB and VIIIB metals. Preferred metallic ions of such bases include lithium, sodium, potassium, magnesium, zinc, calcium, manganese, aluminum, tungsten, zirconium, titanium and hafnium. The amines are preferably hindered organic tertiary amines such as tributylamine, triethylamine, triethylene diamine, dimethyl cetylamine and similar compounds. While primary or secondary amines could be used, they are not preferred unless the neutralization step takes place after the polymer is formed, because the amine hydrogen will readily react with the isocyanate groups thereby interfering with the polyurethane/polyurea polymerization. One of ordinary skill in the art is aware of additional appropriate chemicals for neutralization.

In accordance with another embodiment of the present invention, the acid-functional polyurethane/polyurea comprises from 1 to 100% by weight of the golf ball cover composition and/or the intermediate layer composition. Unless otherwise stated herein, all percentages are given in percent by weight of the total composition. Preferably, the acid-functional polyurethane/polyurea comprises from about 10 to about 90%, more preferably from about 10 to about 75 and most preferably from about 15 to about 40 of the cover composition and/or the intermediate layer composition. About 90 to 10%, more preferably from about 90 to about 25 and most preferably from about 85 to about 60 of the cover and/or the intermediate layer composition is comprised of one or more other polymers such as, but not limited to non-polyurethane/polyurea ionomers, non-anionic polyurethanes or polyureas, epoxy resins, polyethylenes, polyamides and polyesters, polystyrenes, polycarbonates, and polyacrylics. In particular, thermoplastic acid-functional polyurethane/polyurea may be optionally blended with at least one additional thermoplastic ionomer and/or with at least one non-ionomeric thermoplastic resin, while acid-functional polyurea may be optionally blended with at least one additional thermoset ionomer and/or with at least one non-ionomeric thermoset resin. Examples of suitable and preferable polymers for blending with the acid-functional polyurethane/polyurea of the present invention, methods and agents for such blending, as well as conventional additives include catalysts; surfactants; blowing agents for foams; stabilizers; metals; colorants including pigments and dyes; fillers; viscosity modifiers; release agents; plasticizers; processing aids; antioxidants; compatibility agents; dispersing agents; UV absorbers and hindered amine light stabilizers are described in U.S. Pat. No. 6,207,784 which is incorporated by reference in its entirety herein.

Preferable catalysts include reactive and unreactive tertiary amines, such as triethylenediamine, n-methyl morpholine, n-ethyl morpholine, diethylethanol amine, n-coco morpholine, 1-methyl-4-dimethylaminoethyl piperazine, 3-methoxy-n-dimethylpropylamine, n,n-diethyl-3-diethyl aminopropylamine, dimethylbenzyl amine, bis(n, n-dimethylaminoethyl)ether and 1,4-diazabicyclo[2.2.2] octane, dimethylcyclohexylamine, and dimethylethanolamine; and organo-metallic catalysts or metal salt catalysts such as stannous octoate, dibutyltindilaurate, dimethyltindilaurate, dibutyltindialkylmercaptide, and potassium octoate. Catalysts are generally added in an amount of from about 0 to about 50,000 parts per million to the reaction mixture.

An optional filler component may be chosen to impart additional density to blends of the previously described components. The selection of such filler(s) is dependent upon the type of golf ball desired (i.e., one-piece, two-piece, multi-layer, or wound). Generally, the filler will be inorganic, having a density greater than about 2 g/cc, preferably greater than 4 g/cc, and will be present in amounts between 5 and 65 weight percent based on the total weight of the polymer components. Examples of useful fillers include zinc oxide, barium sulfate, lead silicate and tungsten carbide, as well as the other well known corresponding salts and oxides thereof.

One of ordinary skill in the art is aware of and familiar with various methods to manufacture golf balls comprising acid-functional polyurethane/polyurea. Typically, the method comprises the steps of forming a golf ball core by conventional means and subsequently forming a cover around the core by either compression molding preformed half-shells of cover stock material comprising an acid-functional polyurethane/polyurea about the core or by injection molding or reaction injection molding ("RIM") cover stock material comprising an acid-functional polyurethane/polyurea about the core. Conventionally, compression molding and injection molding are applied to thermoplastic acid-functional polyurethane/polyurea, while RIM, injection molding and casting are employed on thermoset acid-functional polyurethane/polyurea. These and other manufacture methods are disclosed in U.S. Pat. Nos. 6,207,784, 5,334,673, 5,484,870, and 5,733,428, the disclosures of which are incorporated herein by reference in their entirety.

The invention, with respect to the acid-functional polyurethanes/polyurea and methods for making the same will now be described in more detail with respect to the following non-limiting example:

EXAMPLE

Example 1

Table I Below Illustrates the Components Used to Make a First Acid-Functional Polyurethane Golf Ball Cover Composition Demonstrating the Present Invention

TABLE I

| Chemicals | Experimental Formulation |
| --- | --- |
| Acid-functional Prepolymer* | 1 equivalent |
| Ethacure 300** | 0.20 equivalent |
| 1,4-Butanediol | 0.75 equivalent |
| White Dispersion | 3.5% |

*Prepolymer is a $H_{12}$MDI/acid-functional polyester polyol with 10.27% reactive isocyanate groups.
**Ethacure ® 300 is an amine curative manufactured by Albemarle Corporation.

A golf ball having a core diameter of 1.58 inches and an overall outer diameter of 1.68 inches was made having the cover formulated from the composition above following the teachings of U.S. Pat. No. 5,733,428, the disclosure of which is incorporated herein by reference in its entirety. Specifically, this golf ball comprises a polybutadiane/ZDA core having a diamter of about 1.550 inches, a 50% lithium/sodium Surlyn® blend intermediate layer having a thickness of about 0.035 inches, a cover with a hardness of about 45 on Shore D scale and a thickness of about 0.030 inches, and an overall ball diameter of about 1.680 inches to about 1.689 inches. This ball was tested and the physical properties and the ball performance were listed in Table II.

TABLE II

| Physical Properties | Present Invention |
| --- | --- |
| Cover Hardness, Shore D | 62 |
| Ball Compression | 89 |
| CoR @ 125 ft/sec | 0.810 |

Balls formed with the acid-functional polyurethane/polyurea compositions of the invention typically have a core with an Atti compression above about 55, preferably between about 70 and about 110. As used herein, the term "Atti compression" is defined as the deflection of an object or material relative to the deflection of a calibrated spring, as measured with an Atti Compression Gauge, that is commercially available from Atti Engineering Corp. of Union City, N.J. The outer cover hardness should be at least about 25 on the Shore D scale, and preferably between about 30 and about 70, while the hardness of an intermediate layer comprising the acid-functional polyurethane/polyurea compositions should be at least about 15 on the Shore D scale. The thickness of the outer cover layer should be between about 0.02 inches and about 0.1 inches, while the thickness of an intermediate layer comprising the acid-functional polyurethane/polyurea compositions should be at least about 0.02 inches. Specific gravity of a cover or intermediate layer comprising the acid-functional polyurethane/polyurea compositions should be at least about 0.7. Flexural modulus of a cover or intermediate layer comprising the acid-functional polyurethane/polyurea compositions should be at least about 500 psi, preferably from about 1,000 psi to about 100,000 psi, and more preferably from about 3,000 psi to about 75,000 psi. The percent dimple coverage on the surface of a golf ball of the invention should be at least about 60%, and preferably should be at least about 70%.

All patents and patent applications cited in the foregoing text are expressly incorporated herein by reference in their entirety.

The term "about," as used herein in connection with one or more numbers or numerical ranges, should be understood to refer to all such numbers, including all numbers in a range.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
   a core having a compression greater than about 55; and
   an outer cover comprising an acid-functional polyurethane, polyurea, or copolymer thereof, the outer cover having a Shore D hardness of at least about 25, a thickness of from at least about 0.02 inches to about 0.03 inches, and a specific gravity of at least about 0.7.

2. The golf ball of claim 1, wherein the acid-functional polyurethane or polyurea is formed from an acid-functional prepolymer comprising at least one of an acid-functional polyol, an acid-functional oligomer, or an acid-functional organic amine; and at least one of an isocyanate or an acid-functional isocyanate.

3. The golf ball of claim 2, wherein the acid-functional prepolymer has the formula:

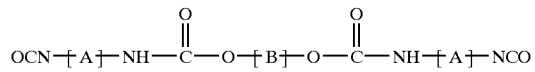

where A=a straight chain or branched aliphatic or alicyclic group, a substituted straight chain or branched aliphatic or alicyclic group, or an aromatic or substituted aromatic group; and B=R—Y, where R=a straight chain or branched aliphatic or alicyclic group, a substituted straight chain or branched aliphatic or alicyclic group, or an aromatic or substituted aromatic group, and Y=$HSO_3$, $HCO_2$, or $H_2PO_3$.

4. The golf ball of claim 2, wherein the acid-functional polyol or acid-functional oligomer comprise carboxylated, sulfonated or phosphonated derivatives of polyester polyol; polyether polyol; polylactone polyol; polytetramethylene ether glycol; poly(oxypropylene)glycol; polybutadiene glycol; polyethylene adipate glycol; polyethylene propylene adipate glycol; polybutylene adipate glycol; diethylene glycol initiated caprolactone; 1,4-butanediol initiated caprolactone; trimethylol propane initiated caprolactone; neopentyl glycol initiated caprolactone; oligomers of dimethylol propionic acid, or oligomers of isophthalic sulfonic acid.

5. The golf ball of claim 2, wherein the acid-functional polyol or acid-functional oligomer has an acid number of from about 10 to about 150, a hydroxyl number of from about 10 to about 175, or a hydroxyl functionality of at least about 1.8.

6. The golf ball of claim 2, wherein the acid-functional prepolymer has an isocyanate content of from about 2% to about 32% and the equivalent weight ratio of isocyanate to curing agent is about 0.80 to about 1.20.

7. The golf ball of claim 2, wherein the isocyanate comprises 4,4'-diphenylmethane diisocyanate; 3,3'-dimethyl-4,4'-biphenylene diisocyanate; toluene diisocyanate; polymeric diphenylmethane diisocyanate; modified liquid 4,4'-diphenylmethane diisocyanate; hexamethylene-diisocyanate; 4,4'-dicyclohexylmethane diisocyanate; isophorone diisocyanate; m-tetramethylxylene diisocyanate; p-tetramethylxylene diisocyanate; p-phenylene diisocyanate; m-phenylene diisocyanate; or low-free isocyanate.

8. The golf ball of claim 2, wherein the acid-functional polyurethane or polyurea further comprises a curing agent.

9. The golf ball of claim 8, wherein the curing agent comprises an amine curing agent, a glycol curing agent, or a mixture thereof.

10. The golf ball of claim 9, wherein the curing agent is an amine curing agent comprising 4,4'-bis-(sec-butylamino)-dicyclohexylmethane; 1,4-bis-(sec-butylamino)-cyclohexane; 3,5-dimehtylthio-2,4(2,6)-toluenediamine; 3,5-diethyl-2,4(2,6)-toluenediamine; N,N'-dialkyldiamine diphenyl methane; trimethylene-glycol-di-p-aminobenzoate; or polytetramethyleneoxide-di-p-aminobenzoate with molecular weight ranging from about 250 to about 1000.

11. The golf ball of claim 9, wherein the curing agent is a glycol curing agent comprising ethylene glycol; diethylene glycol; propylene glycol; 1,3-propane glycol; 1,4-butanediol; 1,5-pentanediol; 1,6-hexanediol; or polytetramethylene ether glycol with molecular weight ranging from about 250 to about 1000.

12. The golf ball of claim 2, wherein the acid-functional isocyanate comprises carboxylated, sulfonated or phosphonated derivatives of diphenylmethane-2,4'-diisocyanate; diphenylmethane-4,4'-diisocyanate; 3,3'-dimethyl-4,4'-biphenylene diisocyanate; 2,4-toluene diisocyanate; methylenebis-(4-cyclohexyl diisocyanate); phenylene-1,4-diisocyanate; diphenyl ether 4,4'-diisocyanate; naphthylene-1,5,-diisocyanate; p-phenylene diisocyanate; p,p'-diphenyl diisocyanate; hexahydrophenylene-1,3-diisocyanate; hexahydrophenylene-1,4-diisocyanate; triphenylmethane-4,4,4',4"-triisocyanate; perhydrodiphenylmethane-2,4'-diisocyanate; perhydrodiphenylmethane-4,4'-diisocyanate; ethylene diisocyanate; propylene-1,2-diisocyanate; tetramethylene-1,4-diisocyanate; hexamethylene-1,6-diisocyanate; dodecane-1,12-diisocyanate; dicyclohexyl-methane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; or 1,3-xylene diisocyanate.

13. The golf ball of claim 2, wherein the acid-functional organic amine comprises carboxylated, sulfonated or phosphonated derivatives of polyolamines; polymethylene-di-p-aminobenzoates; polyethyleneglycol-bis(4-aminobenzoates); polydimethylsiloxane-bis(4-aminobenzoates); polytetramethyleneetherglycol-di-p-aminobenzoates; polypropyleneglycol-di-p-aminobenzoates; N,N,N',N'-tetramethyl-ethylenediamine; 1,4-diazobicyclo (2,2,2)-octane; N-methyl-N'-dimethylaminoethylpiperazine; N,N-dimethylbenzylamine; bis-(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine; 1,2-dimethylimidazole; or 2-methylimidazole.

14. The golf ball of claim 2, wherein the prepolymer further comprises a co-polymer polyol comprising polytetramethylene ether glycol; poly(oxypropylene) glycol; poly(ethylene oxide capped oxypropylene) glycol; diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,5-pentanediol initiated polycaprolactone; 1,6-hexanediol initiated polycaprolactone; polytetramethylene ether glycol initiated polycaprolactone; polyethylene adipate glycol; polyethylene propylene adipate glycol; polybutylene adipate glycol; ortho-phthalate-1,6-hexanediol polyester polyol; polyethylene terephthalate polyester polyol; poly(hexamethylene adipate) glycol; poly(phthalate carbonate) glycol; poly(hexamethylene carbonate) glycol; polycarbonate glycols containing bisphenol A; hydroxy-terminated polybutadiene glycol; hydroxy-terminated liquid isoprene rubber; acrylic polyol; or p-dimer alcohols coverted from dimerized fatty acids.

15. The golf ball of claim 1, further comprising an intermediate layer disposed between the core and the cover.

16. The golf ball of claim 15, wherein the intermediate layer has a thickness of between about 0.02 inches and about 0.035 inches.

17. The golf ball of claim 1, wherein the acid-functional polyurethane or polyurea comprises a thermoset or thermoplastic material.

18. A golf ball comprising:

a core;

an outer cover comprising an acid-functional polyurethane, polyurea, or copolymer thereof, the cover layer having a Shore D hardness of at least about 25 and a thickness of from at least about 0.02 inches to about 0.03 inches; and an intermediate layer disposed between the core and the outer cover, the intermediate layer comprising an acid-functional polyurethane, polyurea, or copolymer thereof, the intermediate layer having a thickness of from at least about 0.02 inches to about 0.035 inches.

19. A golf ball comprising:

a core;

an outer cover comprising an acid-functional polyurethane, polyurea, or copolymer thereof, the cover layer having a Shore D hardness of at least about 25, a specific gravity of at least about 0.7, and a thickness of from at least about 0.02 inches to about 0.03 inches; and an intermediate layer disposed between the core and the outer cover, the intermediate layer comprising a blend of an acid-functional polyurethane, polyurea, or copolymer thereof and at least one of non-anionic polyurethanes, epoxy resins, polyethylenes, polyamides, polyesters, acid copolymers or their ionomer derivatives, or mixtures thereof.

* * * * *